United States Patent [19]

Tsunoda et al.

[11] Patent Number: 4,830,306
[45] Date of Patent: May 16, 1989

[54] FISHING REEL LEG WITH SOFT COVER

[75] Inventors: Kikuo Tsunoda; Toshiaki Yorikane; Hideo Murakami, all of Hiroshima, Japan

[73] Assignee: Ryobi Ltd., Hiroshima, Japan

[21] Appl. No.: 89,176

[22] Filed: Aug. 25, 1987

[30] Foreign Application Priority Data

Aug. 25, 1986 [JP] Japan ............................... 61-199824
Aug. 29, 1986 [JP] Japan ........................... 61-133396[U]
Aug. 29, 1986 [JP] Japan ........................... 61-133398[U]

[51] Int. Cl.4 ............................................. A01K 89/00
[52] U.S. Cl. ........................... 242/84.2 R; 242/84.1 J; 242/84.1 R; 43/22
[58] Field of Search ............................. 264/273, 271.1; 425/110, 116, 117; 249/83; 242/84.1 R, 84.1 J, 84.1 K, 84.2 R; 43/18.1, 20, 22

[56] References Cited

U.S. PATENT DOCUMENTS

| 412,479 | 10/1889 | Davis | 264/271.1 |
| 1,858,650 | 5/1932 | Weida | 264/275 |
| 1,860,596 | 5/1932 | Reinold | 264/271.1 |
| 2,064,435 | 12/1936 | Loeffler | 264/273 |
| 4,561,604 | 12/1985 | Matsushima | 242/84.1 K |

FOREIGN PATENT DOCUMENTS 30309 9/1975 Japan .
27416 6/1980 Japan .
775 3/1981 Japan .
139463 2/1984 Japan .

Primary Examiner—Stuart S. Levy
Assistant Examiner—Katherine Matecki
Attorney, Agent, or Firm—Finnegan, Henderson, Farabow, Garrett & Dunner

[57] ABSTRACT

A spinning reel has at least one of a leg portion having a slender portion which is covered with a soft synthetic resin covering layer, a handle knob whose main body is covered with a knob cover made of soft material in a state wherein the knob main body is tightly engaged with the knob cover by engaging means and an antilever whose main body is made of hard material and which has an operating piece integrally covered with a cover member provided with slip preventing means.

9 Claims, 7 Drawing Sheets

FISHING REEL LEG WITH SOFT COVER

BACKGROUND OF THE INVENTION

This invention relates to a fishing reel and more particularly to portions of the reel such as a leg portion, a handle knob and an antilever which are touched and gripped with fingers. Antilever refers to anti-reverse-lever hereinafter.

In a spinning reel, when a combination of a sinker and fishing hooks is cast or when a fishing line is wound, a fishing rod is generally held together with a reel fixing plate holding a front portion of the leg portion in a state wherein the main body of the leg portion is held between a middle finger and a third finger. However, in a fishing reel whose leg portion is made of the same material, that is, aluminium or the like as that of the main body of the fishing reel, there are a few of drawbacks such that an angler feels uncomfortable when he touches the leg portion, he is sometimes injured on his fingers and he is apt to get tired when he uses the reel for a long time.

There is another type of a known fishing reel whose leg portion has a covering member made of soft material to cover the gripping surface of the leg portion therewith. The known fishing reel is disclosed in Japanese Utility Model Laid-Open Publications No. 30309/1975 and No. 775/1985.

However, the main body of the leg portion of the conventional reel and its reel fixing plate are partially covered with the covering member by inserting a part of the covering member into a receiving groove formed on the side surface of the main body of the leg portion or by inserting a boss formed on the covering member into a through hole formed in the leg portion. Therefore, the covering member is unstable to cause the covering member to easily seperate from the leg portion and to cause an uncomfortable feeling when an angler grips the leg portion. Further, when the angler desires to grip the leg portion, the covering member is deviated or deformed whereby the leg portion can not be held tightly. Therefore, for example, when relatively big fish are caught by fishing from rocks near the shore, a winding operation for winding a fishing line around a reel cannot be carried out easily.

Further, as a conventional handle knob is made of wear proof resin, when a reel is dropped or hit on something, the knob will be easily broken due to a shock. In addition, as the knob is hard, an uncomfortable gripping feeling is given to an angler. Furthermore, the conventional knob does not fit well fingers of an angler.

Therefore, his fingers are apt to get tired when the reel is used for a long time.

Japanese Patent Laid-Open Publications No. 139463/1985 and No. 27416/1980 disclose two kinds of reels to solve the above problems. However, the former has a grip formed with a peripheral groove into which an elastic member is inserted in a state wherein a part of the elastic member is projected partially. Accordingly, the grip is not sufficiently protected from a shock due to hitting of the reel onto something. Further, as the elastic member is projected in the form of a plurality of stripes parallel to each other, a comfortable feeling is not given to an angler when the grip is held with a hand.

The latter has a grip made of wear proof synthetic resin, the main body of which is coated with synthetic resin with a high elasticity. This grip is tolerable to a shock. However, when a fishing line is wound by rotating the handle of a reel to hook up a big fish pulling violently the line, it is difficult that an angler holds the grip tightly because the whole surfaces of the grip are relatively uniformly soft. If the grip is coated with synthetic resin with a low elasticity, he can hold the grip tightly. In this case, a comfortable feeling is not obtained when an angler holds the grip and the grip does not fit his hand well.

Furthermore, in a conventional fishing reel, as its antilever is made of urea resin or die casting material such as aluminum, it is fragile. Therefore, when the reel is dropped or hit on something, the antilever may be easily broken due to a shock at that time. In addition, the urea resin and die casting material are generally hard. Accordingly, a comfortable feeling is not obtained when an angler holds the antilever and the antilever does not fit his finger well. Further, when a turning operation of the antilever is carried out in a state wherein load is exerted on the antilever, he feels pain at the distal end of his finger thereby to make it impposible to exert a sufficient force thereon.

SUMMARY OF THE INVENTION

It is a general object of this invention to provide a fishing reel which can be easily handled and used tirelessly by an angler for a long time.

It is a concrete object to provide a leg portion in which a vertical portion of a leg main body, a kick lever receiving portion and a portion of a reel fixing plate connected to the vertical portion of the leg main body except two front and rear ends of the reel fixing plate which are respectively inserted into fixing hoods of a reel seat, are formed more slenderly, having narrower circumferences than the other remaining portions of the leg portion in such a manner that outer surfaces of these slender portions are depressed relative to those of the other portions. Furthermore, the slender portions have holes, grooves, recesses or the like being formed in predetermined positions of the slender portions and are covered with a soft synthetic resin covering layer by insert molding over these holes, grooves, recesses or the like, so that the covering layer is securely affixed to the entire portion of the leg portion which are touched and gripped by fingers, whereby the leg main body portion and the reel fixing plate are formed completely integratedly with the covering layer thereby to give a comfortable feeling to an angler when he grips the leg portion, to increase stability, to ensure a tight gripping, to ensure a long use without fatique of fingers and to decrease a shock when a kick lever is operated.

It is another concrete object to provide a handle knob which fits an angler's hand well, which can be used tirelessly and which can be held tightly by his hand.

It is still another conerete object to provide an antilever, the main body of which is fixed to an antilever axis is made of hard material such as hard resin, aluminum and the like, an operational piece being projected from one side of the antilever, the operational piece being formed more slenderly than the lever main body so as to form a step at a projecting portion where the operational piece is projected from the lever main body, the operational piece being, at its surface, provided with a predetermined number of holes, grooves or the like, a cover member made of soft synthetic resin being integrally attached to the operational piece in such a manner that grooves and projections formed on the cover member and functioning to prevent the cover member from slipping are engaged with the holes or the grooves of the operational piece thereby to improve sense of contact and to make it possible to exert a sufficient force onto the antilever without feeling pain on a finger.

The above and other objects, effects and features of the present invention will become more apparent from the following description of preferred embodiments thereof taken in conjunction with the accompanying drawings.

DETAILED DESCRIPTION OF THE INVENTION

Figure 1:
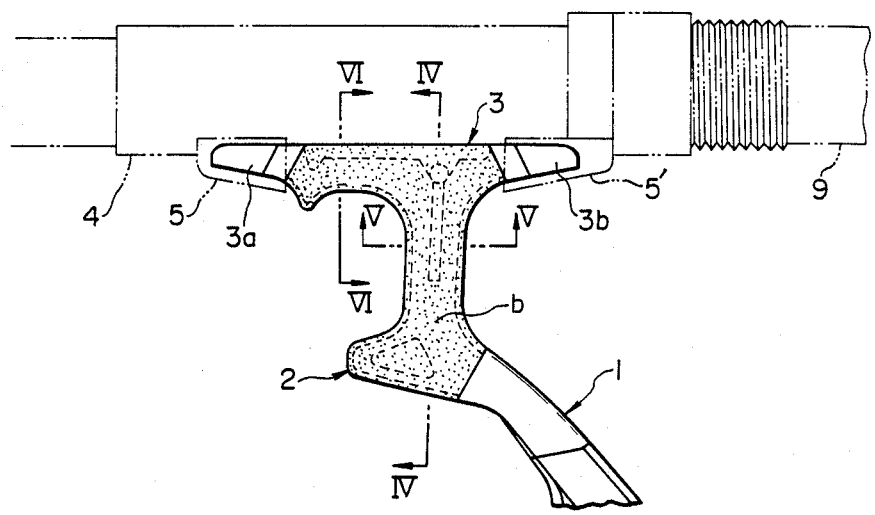
FIG. 1 is a side view showing a leg portion of a reel according to this invention.
Figure 2:
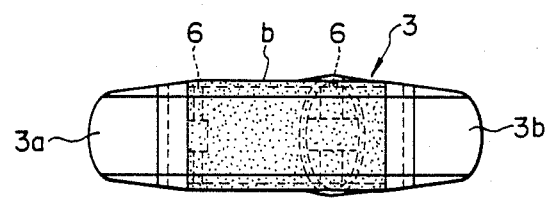
FIG. 2 is a plain view of the leg portion of FIG. 1.
Figure 6:
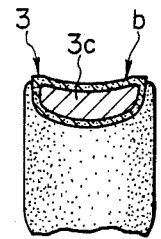
FIG. 6 is a sectional view of the leg portion taken along the line VI—VI as viewed in an arrow direction.

In FIGS. 1 and 6, a fishing reel of this invention has a main body 1 of a leg portion which extends obliquely in the upward and forward direction from a reel main body not shown in the drawings and whose front end extends approximately uprightly, a kick lever receiving portion 2 which extends forward from a boundary between a slanting poriton 1b and a vertical portion 1a of the main body of the leg portion and a reel fixing plate 3 formed approximately horizontally at the upper end of the vertical portion 1a. The main body 1 is formed integrally with the reel main body by die casting and is made of aluminum material or the like. When the main body 1 is formed, a forward end portion 1c of the leg main body 1 which is touched by fingers holding the reel, kick lever receiving portion 2 and a center portion 3c of the reel fixing plate 3 except two front and rear portions 3a, 3b which are inserted into two fixing hoods, respectively, are formed more slenderly than other portions. This slender portion a has surfaces intruded or disposed inside and is provided, at its predetermined positions, with a hole 6, a groove 7 and a recess 8 for increasing contact or adhesive strength between a soft synthetic resin covering layer and the outer surface of the center portion 3c. The soft synthetic resin covering layer b is formed in such a manner that the outer surface of the center portion 3c is covered with a soft synthetic resin by insert molding.

The soft synthetic resin covering layer b is formed to be flush with other portions of the leg main body, that is, thick portions and the front and rear portions 3a, 3b of the reel fixing portion, without a difference in thickness or a step between the other portions and the layer b.

Figure 3:
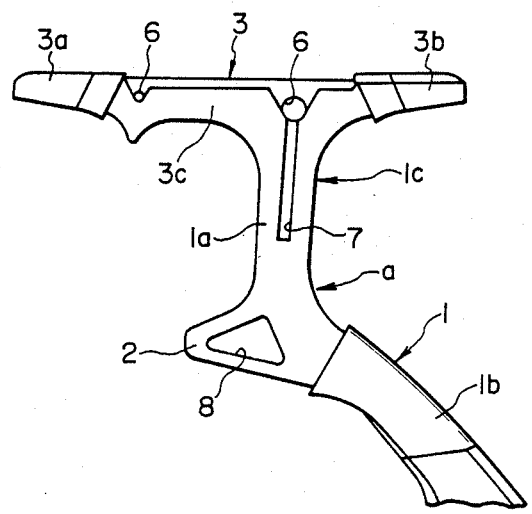
FIG. 3 is a side view of a structure for providing soft synthetic resin covering layer on the leg portion.

The insert molding is carried out in the known manner. In the insert molding, the leg portion in FIG. 3, whose predetermined positions are formed slenderly beforehand as mentioned above is accommodated in a metal mold and melted soft synthetic resin is poured into a cavity between the slender portion a and the metal mold, so that the soft synthetic resin covering layer covers integrally the portion a. After the metal mold is cooled, the metal mold is opened. When the insert molding is carried out, the soft synthetic resin covering layer b is tightly attached to the slender portion a thereby to prevent separation of the layer b because the melted soft synthetic resin is poured or charged into the hole 6, groove 7 and the recess 8. If the surface of the slender portion a is formed to be a roughened surface having a large number of undulations, adhesive or contact strength of soft synthetic resin covering layer b can be more increased.

Figure 4:
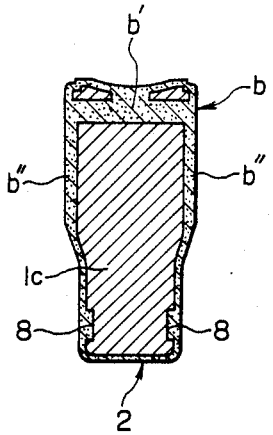
FIG. 4 is a sectional view of the leg portion taken along the line IV—IV as viewed in an arrow direction.
Figure 5:
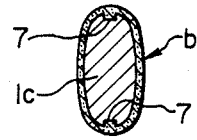
FIG. 5 is a sectional view of the leg portion taken along the line V—V as viewed in an arrow direction.

Further, the reel is fixed to a fishing rod 9 in such a manner that the front and rear ends 3a, 3b of the reel fixing plate 3 are inserted into the fixing hoods 5, 5', of a reel seat 4 provided on the fishing rod 9. An angler holds the reel fixing plate 3 together with the rod 9 when he casts a combination of a fishing line and hooks and winds the fishing line. At this time, as the reel fixing plate 3 is gripped much more tightly than other portions, a portion of the soft synthetic resin, corresponding to the reel fixing plate 3 is subject to a compressive and twisting force due to a gripping force. In order to obtain an adhesive or contacting strength to overcome the compressive and twisting force, the holes 6, 6 are so formed as to pass through two portions of the reel fixing plate 3, e.g., its center and front portions which are gripped most tightly. A soft synthetic resin part b' formed in the holes 6, 6 connects two left and right layers b'', b'' of the soft synthetic resin covering layer b with each other as shown in FIG. 4. The two grooves are longitudinally formed on the left and right sides of the forward end of the main leg portion or the vertical poriton 1a in a manner that the upper end of each groove is connected to each hole 6. One of the holes 6, 6, corresponding to a portion where a big gripping force is exerted, may be formed so as to have a diameter larger than that of the other one.

Further, in a conventional spinning reel, a bail arm (not shown) is turned to let out a fishing line and is turned reversely to wind the fishing line. When the bail arm is automatically turned reversely, a rotor is rotated by a handle so that a kick lever (not shown) abuts against a side wall of the kick lever receiving portion 2. In such a type of the spinning reel, two recesssses 8, 8 are formed on the two sides of the kick lever receiving portion 2 to increase a thickness of soft synthetic resin covering layer b in positions corresponding to the recesses 8, 8 as shown in FIG. 4. This corresponding thick portions of the layer b function to prevent breakage and separation of the soft synthetic resin covering layer b even if the kick lever abuts against the kick lever receiving portion 2 repeatedly.

In this invention, the leg portion of a spinning reel is formed in the above manner. That is, the front portion 1c of the leg main body, which fingers contact, the kick lever receiving portion 2 and the portion 3c of the reel fixing plate 3 except the front and rear ends 3a, 3b inserted into the fixing hoods 5, 5' of the reel fixing plate 3 formed at the front end of the leg main body 1 are formed, by insert molding, more slenderly than other portions and the soft synthetic resin covering layer b covers the whole area of the slender portion a where a palm and fingers contact. In addition, the hole 6, groove 7 and recesses 8 are provided in the slender portion a to receive the covering layer b. Accordingly, sense of contact is improved and the covering layer b is attached tightly to the slender portion a thereby to prevent deviation and separation of the layer b. Further, sense of stability is improved to ensure a tight gripping of the reel and the fishing rod without slipping of a hand on the leg portion. This results in ensuring a reliable line winding operation when the line is cast far away and big fish are hooked up and in preventing fatigue when a fishing rod is used for a long time. In addition, in a reel having an automatic reverse turning mechanism, the covering layer b can absorb or decrease a shock when the kick lever collides with the kick lever receiving portion 2 whereby an angler can enjoy fishing more than before.

Figure 7:
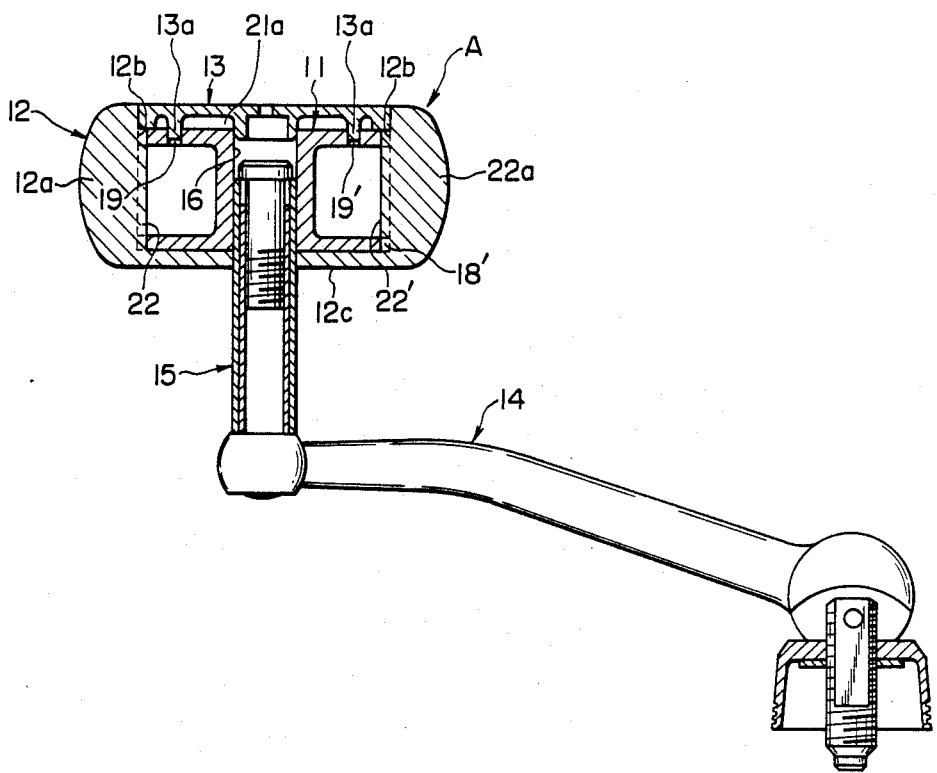
FIG. 7 is a vertical sectional view of a handle knob of a fishing reel according to this invention.
Figure 8A:
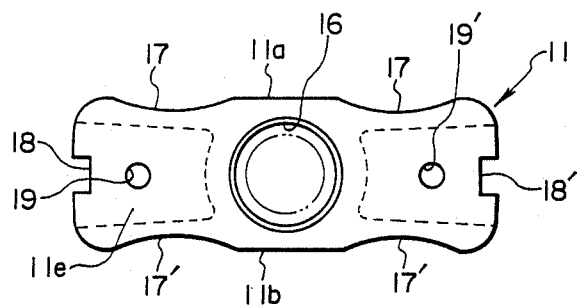
FIG. 8 (A) (B) (C) are three front, vertical sectional and side views of the handle knob, respectively.
Figure 8B:
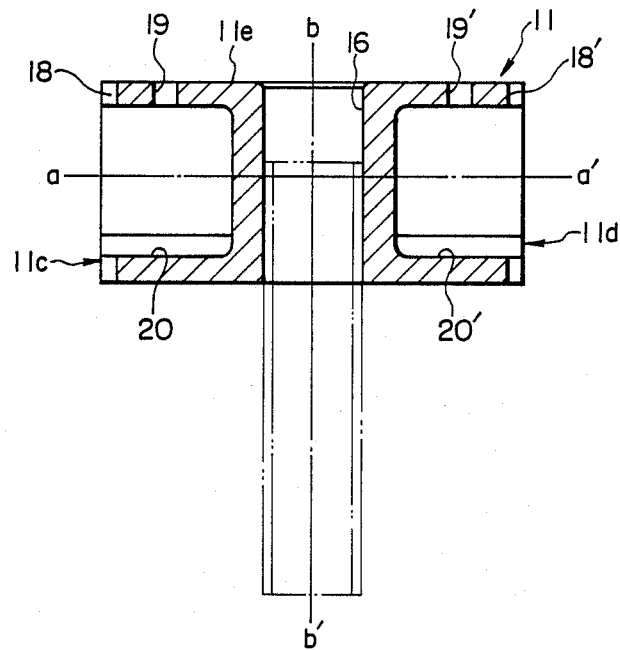
Figure 8C:
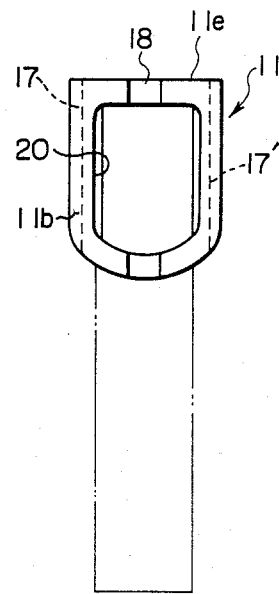
Figure 9A:
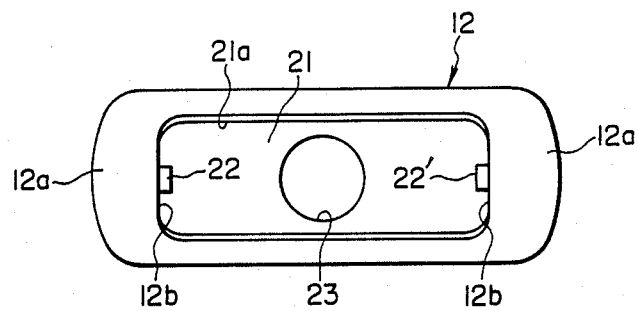
FIG. 9 (A) (B) (C) are three front, plan and cross sectional views of a knob cover of the handle knob; respectively.
Figure 9B:
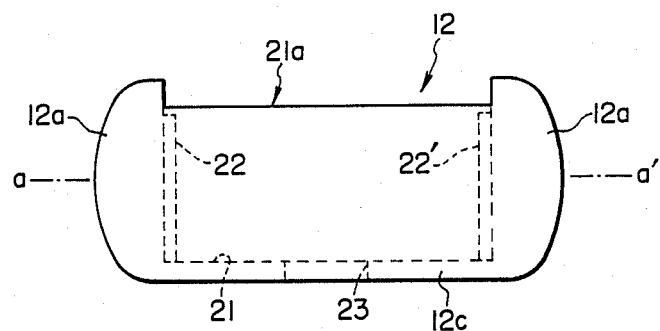
Figure 9C:
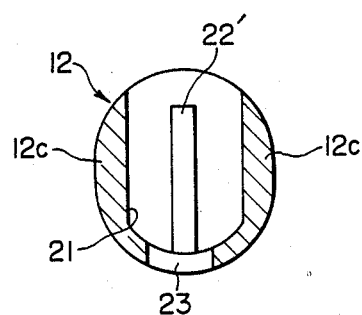

A handle knob according to this invention will now be explained in detail with reference to FIGS. 7 to 9. The handle knob A has a knob main body 11, a knob cover 12 and a cover member 13. The knob main body 11 is made of hard material such as hard synthetic resin and aluminum or the like and has a long and slender shape. The main body 11 is provided with a bearing hole 16 for receiving a support axis 15. The bearing hole 16 passes through the knob main body 11 in the short axis direction b—b' perpendicular to the longitudinal direction a—a' thereof. On the two side walls 11a, 11b parallel to each other are formed a plurality of (two on each side wall in this embodiment) receesses 17 17 17' 17' each depressed in the form of an arc. For example, the arched surface of each recess may have the same curvature as that of fingers contacting there.

The knob main body 11 has two recesses 18 18' at two ends 11c, 11d thereof in its longitudinal direction. The recesses 18 18' are formed synmetrically with respect to the center of the main body 11 so as to extend in the short axis direction b—b'. The knob main body 11 is provided, on the front side, with a predetermined number of receiving holes 19 19' into which each boss of the cover member 13 is tightly inserted.

The knob main body 11 of this embodiment has two hollow spaces 20 20' at its two ends in the longitudinal direction a—a' to form a partial hollow knob. However, the two spaces 20 20' may not be necessariily formed.

The knob cover 12 is integrally made of soft material such as vynyl chloride, rubber and the like, and has a hollow space 21 into which the knob main body 11 is inserted tightly. The hollow space 21 has an open face 21a at the center portion of its front face and the body 11 has two thick walls at its opposite ends 12a, 12a in the longitudinal direction a—a' to prevent an elastic deformation thereat. On two walls 12b 12b opposite to the two ends 12a, 12a, that is, on the inner surfaces at the two ends of the hollow space 21 are formed two engaging projections 22 22' for engaging with the two recesses 18 18', respectively. The two engaging projections 22 22' are opposite to each other in parallel in the front and rear direction or in the short axis direction b—b'.

The body 12c of the knob cover 12 is in the form of a thin wall so as to be deformed elastically. At the center position of the body 12c is provided a window 23 connected to the hollow space 21 in a manner corresponding to the bearing hole 16.

The cover member 13 is made of soft material so as to engage with the open face 21a of the knob cover 12 and has, at its inner surface, two projected bosses 13a, 13a for engaging with the receiving holes 19, 19'.

Thus, the knob main body 11 is inserted into the hollow space 21 of the knob cover 12 through its open face 21a to engage the knob cover 12 with the knob main body 11. At this time, the recesses 18, 18' of the knob main body 11 are engaged with the projections 22, 22' of the knob cover 12 as shown in FIG. 7. Thereafter, the cover member 13 is engaged with the open face 21a in a manner that the bosses 13a, 13a are inserted into the receiving holes 19 19'. The handle knob A comprises of an integral combination of the knob main body 11, knob cover 12 and the cover member 13. The handle knob A mentioned above is rotatably connected to a handle 14 in such a manner that the support axis 15 is tightly inserted, by known means, into the bearing hole 16 of the knob main body 11 through the window 23 of the knob cover 12.

As is mentioned above, as the knob main body 11 is covered with the knob cover 13 made of soft material and the cover member 13 made of the same material, a shock against the handle knob can be absorbed and alleviated thereby to prevent breakage of the knob main body 11. In addition, as the knob cover 12 is deformed elastically along a plurality of the recessess 17, 17, 17', 17' formed on the surfaces of the knob main body 11, sense of contact is improved and the surfaces of the knob main body 11 fit an angler's hand well. Further, as the knob cover 12 has an undulated surface, the area of contact of fingers and the surface of the knob cover 12 is increased thereby to efficiently prevent slipping of a hand. Furthermore, as elasticity of the knob cover 12 is properly limited so that deformation of the knob cover 12 is not permitted any more after the cover 12 is deformed along recesses 17, 17' to some extent, the handle knob A can be gripped tightly. Accordingly, when a fishing line is wound to hook up fish pulling firecely or violently the line, a big force can be easily exerted on the handle knob by hand to ensure a reliable handle rotating operation and to ensure a long use of a reel of this invention without fatigue. Further, the knob main body 11 and the knob cover 12 are engaged with each other in a manner that the recesses 18 18' receive the respective projections 22, 22' at the respective ends of the body 11 and the cover 12. Therefore, the handle knob A has a sufficient strength against a twisting force, whereby the handle knob A can be prevented form separation of the knob cover 12 from the knob main body 11. The handle knob A of this invention has these practial advantageous effects.

Figure 10C:
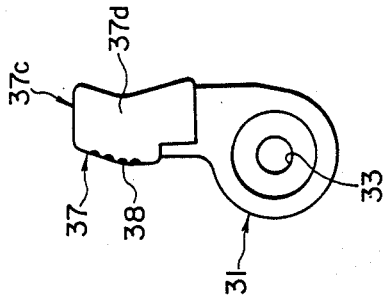
FIG. 10 (A) (B) (C) are three side, front and rear views of an antilever of a spinning reel according to this invention, respectively, FIG. 10 (A) having a partial section.
Figure 11C:
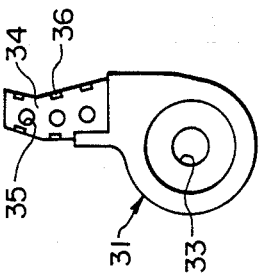
FIG. 11 (A) (B) (C) are three side, front and rear views of a main body of the antilever, FIG. 11(A) having a partial section.
Figure 10A:
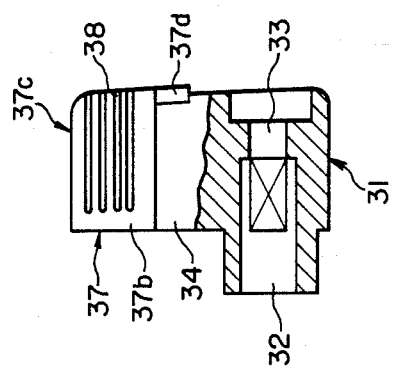
Figure 11A:
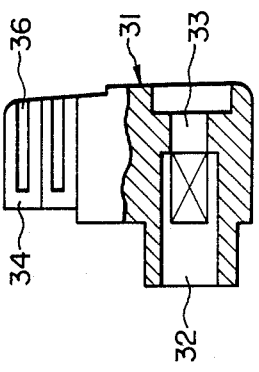
Figure 10B:
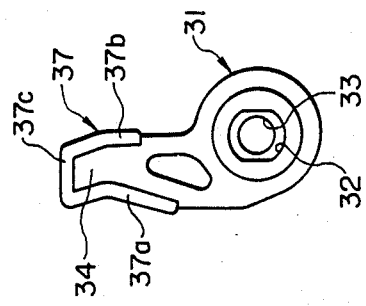
Figure 11B:
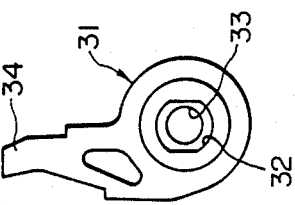
Figure 12C:
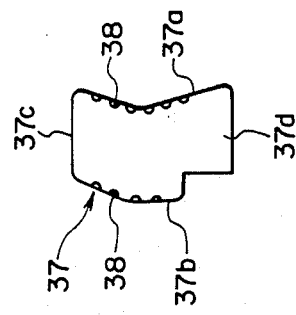
FIG. 12 (A) (B) (C) are three side, front and rear views of a cover member of the antilever.
Figure 12A:
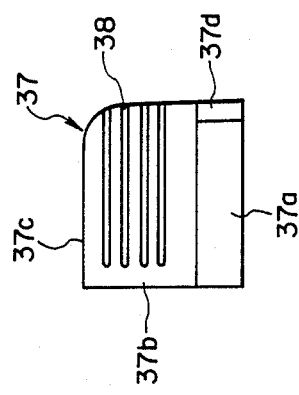
Figure 12B:
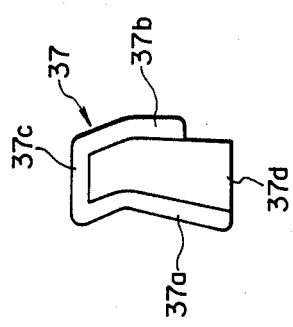

Next, an antilever of a reel according to this invention will be explained with reference to FIGS. 10 to 12. A lever main body 31 is integrally made of soft material such as die casting material, that is, hard resin, aluminum or the like, and is adapted to be fixedly engaged with a lever axis by a fastener. The lever main body 31 is provided with an engaging hole 32 for receiving the lever axis and with a fastener inserting hole 33 which is disposed coaxially with the hole 32 in the lateral direction and which is connected to the hole 32. Further, the lever main body 31 has an operating piece 34 integrally projected from one side thereof in the radial direction to form a long plate-like shape.

The operating piece 34 is in the form of > in its front view so that a force can be easily exerted thereon and is slenderer than the lever main body 31 to form a step at the boundary between two front faces of the lever main body 31 and the operating piece 34. The operating piece 34 has, at its front face, a predetermined number of holes 35 and grooves 36 to increase a contacting area, that is, adhesive or uniting strength between the front face and a cover member mentioned after. The operating piece 34 is covered with the cover member 37 made of soft resin with a high elasticity such as vynyl chloride, rubber or the like.

The cover member 37 is so formed as to fit the outer surfaces of the operating piece 34. It has two left and right side walls 37a, 37b, a top wall 37c and a back wall 37d so as to form a hollow member having a >-like shape with two open front and lower faces. Thus, the cover member 37 is put on the operating piece 34 from its rear side, that is, from the right side in FIG. 10(A). Instead, the lever main body and the cover member may be formed integrally with each other by insert molding. Further, on the left and right side walls of the cover member 37 are provided slip preventing means 38, that is, a plurality of long grooves or projections extending laterally to prevent fingers from slipping thereon.

The surface of the cover member 37 may be flush with that of the lever main body 31. However, if the surface of the cover member is projected slightly outwardly from the outer surface of the lever main body 31 as shown in the drawings, the antilever becomes more convienient than before because fingers do not contact the lever main body 31 but contact only the cover member 37.

In the antilever of this invention, as the operating piece projected from the lever main body 31 is covered with the cover member made of soft material, a shock can be absorbed or alleviated, thereby to prevent the piece 34 from breaking when a reel happens to be dropped or hit on something. Further, sense of contact is improved when fingers contact the antilever and the slip preventing means 38 can prevent fingers from slipping thereon, so that fingers fit well the cover member 37 to facilitate a turning operation of the antilever. In addition, as the cover member 37 is soft, an angler does not feel pain on his fingers whereby a force can be easily exerted thereon to ensure a reliable turning operation of the antilever. Further, if the lever main body 31 and the cover member 37 are made of coloring material, its appearance can be easily varied to obtain easily a beautiful apperance.

What is claimed is:

1. A leg portion of a spinning reel for mounting on a reel seat of a fishing rod, comprising:
a fixing plate having a center portion between front and rear portions and lying in a first plane for insertion into spaced fixing hoods of the reel seat, the rod extending in a longitudinal direction substantially parallel to the first plane when the front and rear portions are fixed in the reel seat;
a main body having a vertical portion extending from the fixing plate substantially perpendicular to the first plane, a slanting portion and connected thereto at a junction extending obliquely from the vertical portion, and a kick lever receiving portion extending in a forward direction away from the slanting portion at the junction of the vertical and slant portions, the main body and the fixing plate each having a thickness dimension extending transverse to the longitudinal direction and defined by exterior surfaces of the main body and the fixing plate, respectively, the center portion of the fixing plate, the kick lever receiving portion, and the vertical portion of the main body having a thickness less than the front and rear portions of the fixing plate and the slant portion of the main body, and the main body and fixing plate having surface irregularities in the exterior surfaces thereof; and
a homogeneous soft molded covering layer surrounding portions of the main body for providing a gripping surface for the leg portion of the spinning reel, said covering layer extending into the surface irregularities of the exterior surface of the center portion of the fixing plate and the kick lever receiving and vertical portions of the main body for securing the covering layer to the leg portion.

2. A leg portion of a spinning wheel according to claim 1, wherein the surface irregularities include a hole extending through the exterior surfaces.

3. A leg portion of a spinning wheel according to claim 2, wherein the hole extends through the exterior surfaces of the center portion of the fixing plate.

4. A leg portion of a spinning wheel according to claim 1, wherein the surface irregularities includes an elongated groove disposed in the exterior surfaces.

5. A leg portion of a spinning wheel according to claim 4, wherein the elongated groove is disposed in the exterior surfaces of the vertical portion of the main body.

6. A leg portion of a spinning wheel according to claim 1, wherein the surface irregularities include a recess disposed in the exterior surfaces.

7. A leg portion of a spinning wheel according to claim 6, wherein the recess is disposed in the exterior surfaces of the kick lever receiving portion of the main body.

8. A leg portion of a spinning wheel according to claim 1, wherein the surface irregularities include a hole extending through the exterior surfaces of the center portion of the fixing plate and an elongated groove being disposed in the vertical portion of the main body in communication with said hole.

9. A leg portion of a spinning wheel according to claim 1, wherein the surface of the covering layer is flush with the surface of the front and rear portions of the fixing plate and the slant portion of the main body.

* * * * *